United States Patent [19]

Suzuki et al.

[11] Patent Number: 4,458,313
[45] Date of Patent: Jul. 3, 1984

[54] MEMORY ACCESS CONTROL SYSTEM

[75] Inventors: Seigo Suzuki, Yokohama; Sdiji Eguchi, Kawasaki; Yoshiaki Moriya, Inagi, all of Japan

[73] Assignee: Tokyo Shibaura Electric Company, Ltd., Kawasaki, Japan

[21] Appl. No.: 324,958

[22] Filed: Nov. 25, 1981

Related U.S. Application Data

[63] Continuation-in-part of Ser. No. 193,461, Oct. 3, 1980, abandoned, which is a continuation of Ser. No. 872,733, Jan. 26, 1978, abandoned, which is a continuation-in-part of Ser. No. 732,729, Oct. 15, 1976, abandoned.

[30] Foreign Application Priority Data

Oct. 15, 1975 [JP] Japan .................................. 50-124151

[51] Int. Cl.³ .......................... G06F 9/06; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,996,564 | 12/1976 | Kerrigan et al. | 364/200 |
| 4,034,349 | 7/1977 | Monaco et al. | 364/200 |
| 4,038,642 | 7/1977 | Boukneckt | 364/200 |
| 4,053,950 | 10/1977 | Bourke et al. | 364/200 |
| 4,057,846 | 11/1977 | Cockerill et al. | 364/200 |
| 4,067,059 | 1/1978 | Derchak | 364/200 |
| 4,075,691 | 2/1978 | Davis et al. | 364/200 |
| 4,099,236 | 7/1978 | Goodman et al. | 364/200 |
| 4,181,938 | 1/1980 | Suzuki et al. | 364/200 |

Primary Examiner—Harvey E. Springborn
Attorney, Agent, or Firm—Finnegan, Henderson, Farabow, Garrett & Dunner

[57] ABSTRACT

A memory access control system selects a program mode to carry out a cycle steal operation in response to a logic "1" condition of a predetermined bit position included in a command and selects a direct memory access mode to effect a direct memory access in response to a logic "0" condition of the predetermined bit position.

2 Claims, 5 Drawing Figures

MEMORY ACCESS CONTROL SYSTEM

This application is a continuation-in-part of U.S. Pat. application Ser. No. 193,461, filed Oct. 3, 1980 now abandoned, which was a continuation of U.S. patent application Ser. No. 872,733, filed Jan. 26, 1978 now abandoned, which was a continuation-in-part of U.S. Pat. application Ser. No. 732,729, filed Oct. 15, 1976, now abandoned.

BACKGROUND OF THE INVENTION

This invention relates to a memory access control system adapted for use with a one-chip processor integrally assembled with a direct memory access controller.

In recent years, a microprocessor or central processing unit (CPU) integrated in one chip has become widely accepted as a data-processing system due to enhancements in the development of semiconductor manufacturing techniques. The widespread dissemination of such CPU's has led to the use of a large variety of input-output devices (abbreviated as "I/O devices") with such a computer system. Presently available I/O devices, however, often operate at a higher speed than a processor. Where the I/O device operates at a rate faster than the rate of the processor, it is inefficient to transfer data between the I/O device and the main memory of the computer through the CPU.

To eliminate this drawback, therefore, a direct memory access (abbreviated as "DMA") system has been adopted. A DMA system is designed to effect direct data transfer between the main memory and an I/O device without transferring the data through the CPU, thereby offering the advantages of decreasing the work load on the CPU, elevating data transfer rates, and realizing the quick and efficient processing of data.

Where, however, the DMA system has been adopted in actual practice, the following situation arises. A control system for the practical application of the DMA system includes a system DMA mode for preventing memory access from being effected through the CPU and a system program mode which carries out a memory access on a cycle steal basis wherein a memory accesses through the CPU are alternated with accesses by the DMA. The DMA mode decreases the load on the hardware more than the program mode but results in a lower overall data transfer efficiency.

In contrast, the program mode effects overall data transfer more efficiently than the DMA mode, but requires a data buffer to be provided because of the alternating data transfers by the DMA. Implementation of the program mode further requires an external control circuit to be installed in order to determine whether a request for a memory access is to be undertaken through the CPU or by the DMA. In the past, the time consumed by processing within the control circuit results in added inefficiency, a failure to increase the overall data transfer efficiency to the degree expected, and an increase in the complexity of the hardware arrangement in order to implement the program mode along with the DMA mode.

In order to improve the data transfer efficiency of the program mode, it is necessary to provide a DMA controller (abbreviated as "DMAC") integrally with a CPU, that is, to form both units in a single chip to constitute a large scale integration (abbreviated as "LSI") processor. Such integration enables, for example, the easy transfer of a status command between the CPU and the DMAC in the LSI processor. A further advantage of LSI fabrication is that a request for temporary exclusive use of a memory bus by the CPU or the DMA takes place in the LSI processor and is quickly resolvable. Moreover, the interchangeable use of the memory bus by the CPU or the DMA is attained in an extremely short time by means of the DMAC, thereby greatly increasing the processing efficiency of the processor system.

A need sometimes arises for the selective application of the program mode or the DMA mode according to the instructions of a program in order to process data effectively. However, the installation of an additional external mode-selecting device for control of the above-mentioned selection results not only in an increased load on the operator and the hardware but also in a significant time loss. In the past, the use of an external mode-selecting device has also caused inefficient control of the processor system.

SUMMARY OF THE INVENTION

It is accordingly an object of this invention to provide a direct memory access control system which selects a program mode or a DMA mode in response to the logic status of a predetermined bit position included in a command in a one-chip processor comprising a CPU and a DMAC integrally assembled together and which efficiently controls memory accessing according to the selected mode.

According to an aspect of this invention, there is provided a direct memory access control system, wherein a predetermined bit position is provided in a command formed of an address section for designating a required I/O device and an instruction code section. A DMA mode is selected in response to a given logic status of the predetermined bit position to prevent a memory access from being effected through the CPU and to allow memory access to be carried out by the DMA. A program mode is selected in response to another logic status of the predetermined bit position to cause a memory access through the CPU and the DMA to be undertaken alternately, that is, to effectuate a cycle steal.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims wherein a memory access control system comprises an integral assembly of a central processing unit and a direct memory access controller, a main memory, an I/O device, a bus interconnecting the memory and the I/O device to each other, to the central processing unit, and to the direct memory access controller, apparatus which generates a logic signal representing the logic status of a predetermined bit position in a command, a bus controller for generating a control signal in response to the logic signal and a request signal from either the central processing unit or the direct memory access controller, a bus switch connected to the bus and responsive to the control signal whereby the bus switch causes the bus to place the memory and the I/O device under the control of the direct memory access controller when the bus controller receives a logic signal representative of one logic status of the predetermined bit position and causes the bus to perform a cycle steal memory access between the memory and I/O device when the bus controller receives a logic signal representative of another logic status of the predetermined bit position.

BRIEF DESCRIPTION OF THE DRAWINGS

The accompanying drawings, which are incorporated in and constitute a part of this specification, illustrate embodiments of the invention and, together with the description, serve to explain the principles of the invention.

DETAILED DESCRIPTION OF THE INVENTION

Reference will now be made in detail to the present preferred embodiments of the invention, as illustrated in the accompanying drawings.

Figure 1:
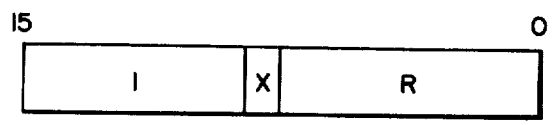
FIG. 1 shows the format of a command which can be used in a memory access control system embodying this invention.

Referring to the command format shown in FIG. 1, a predetermined bit position X is provided in the command between an I/O device-designated address section R and an instruction code section I.

Figure 2B:
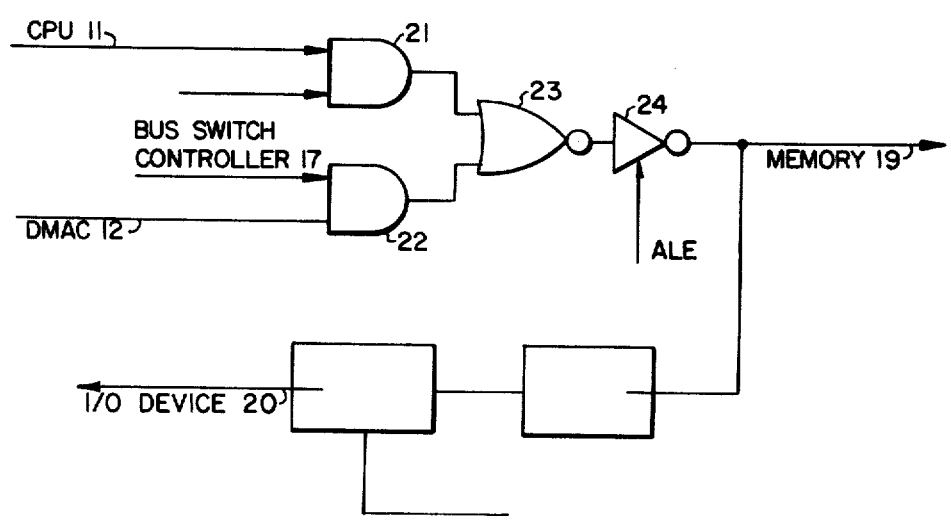
FIG. 2B is a block circuit diagram of an embodiment of the bus switch of the control system of FIG. 2A.
Figure 2A:
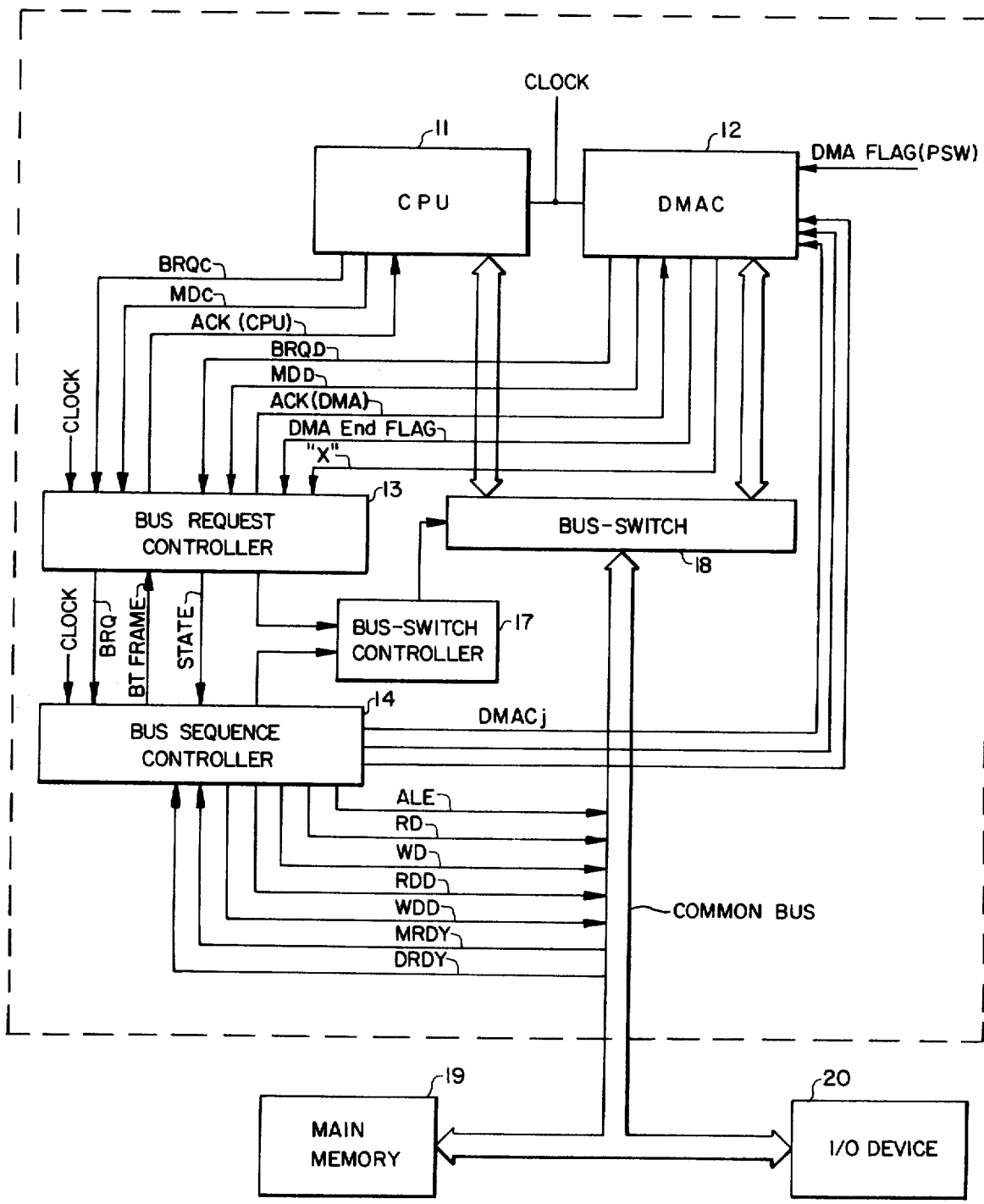
FIG. 2A is a circuit block diagram showing one embodiment of a hardware arrangement of the present memory access control system.

FIG. 2A shows a processor system for executing the above-mentioned command. As shown in FIG. 2A, an integrated CPU-DMAC device 10 includes a central processor unit (CPU) 11 and a direct memory access controller (DMAC) 12. The CPU 11 is provided in the proper timing sequence with a CPU bus control section (not shown), which produces a bus operation request signal ($BRQ_C$) and a mode signal ($MD_C$) of a read/write cycle. Signal lines connect the CPU 11 with a bus request controller 13 for transferring the $BRQ_C$ and $MD_C$ signals to the bus request controller 13.

The DMAC 12 produces a DMA bus operation request ($BRQ_D$), a mode signal ($MD_D$), an X bit signal (X), and a DMA end flag signal. Signal lines for transferring the $BRQ_D$, $MD_D$, X, and DMA end flag signals are connected to the bus request controller 13. The bus request controller 13 detects the priorities of the bus requests from the CPU 11 and the DMAC 12, according to the contents of the signal X and the DMA end flag signal. One of these bus requests which has priority over the other is transferred to a bus sequence controller 14 through another signal line. Further, the bus request controller 13 supplies a state signal STATE to the bus sequence controller 14 through another signal line. The STATE signal contains the output signals of the CPU bus control section and the DMAC 12, i.e., the $MD_C$, $MD_D$, DMA end flag and X signals.

The bus sequence controller 14 supplies a common bus control signal group and a DMA channel selection signal ($DMAC_j$) to a common bus and DMA controller 14, respectively, via signal lines. The common bus control signal group includes an address latch enable (ALE) signal, a read data request ($\overline{RD}$, $\overline{RDD}$) signal, a write data ($\overline{WD}$, $\overline{WDD}$) signal, and timing control signals MRDY and DRDY. State signals are supplied from the bus request controller 13 and the bus sequence controller 14 to a bus switch controller 17. The bus switch controller 17 produces a signal for controlling a bus switch 18. In response to the control signal from the bus switch controller 17 the bus switch 18 selects either the bus connected to the CPU 11 or the bus connected to the DMAC 12 for connection to the common bus. The bus switch 18 is connected to a main memory 19 and an I/O device 20 via the common bus.

As illustrated in FIG. 2B, the bus switch 18 includes two AND gates 21 and 22 having first input terminals which are connected to the buses of the CPU 11 and the DMAC 12, respectively. The second input terminals of the AND gates 21 and 22 are connected to the control signal output terminal of the bus switch controller 17. The AND gates 21 and 22 are connected to the first and second input terminals of NOR gate 23, respectively. The output terminal of the NOR gate 23 is connected to the main memory 19 via an inverter 24 and a bus. The bus connected to the memory 19 is connected to the I/O device 20 through buffers 25 and 26.

The operation of the microcomputer of the above-mentioned construction will now be described.

When the CPU 11 and the DMAC 12 supply the bus request controller 13 with bus operation requests $BRQ_C$ and $BRQ_D$ and mode signals $MD_C$ and $MD_D$, the bus request controller 13 detects the priorities of $BRQ_C$ and $BRQ_D$ according to the signal value of bit X and the contents of the DMA end flag signal from the DMAC 12. For example, if the predetermined bit position X has a binary value "1", $BRQ_D$ is accepted and is transferred to the bus sequence controller 14 through the signal line. In response to the state signals of the bus request controller 13 and the bus sequence controller 14, i.e., signal X and timing signal MRDY, the bus switch controller 17 supplies a bus switch control signal to the bus switch 18. When the predetermined bit position X is "1", the bus switch control signal opens the AND gate 22 of the bus switch 18, whereby the bus of the DMAC 12 is connected to the common bus.

When the bus sequence controller 14 supplies a channel select signal $DMAC_j$ to the DMAC 12, one of the channels of the DMAC 12 is selected. An address data is transferred through the selected channel from the DMAC 12 to the bus switch 18. Further, the bus sequence controller 14 generates, for example, a read data signal RDD and an address latch enable signal ALE. The ALE signal is supplied to the buffer 24 of the bus switch 18, thereby latching the address data from the DMAC 12 at the buffer 24. The address data thus latched designates one of the addresses of the main memory 19. Data is read out from the designated address of the memory 19 and supplied to the inverter 25. When the signal RDD is supplied to the buffer 26 of the bus switch 18 under this circumstance, the data is transferred from the buffer 25 into the buffer 26. The data is later transferred from the buffer 26 to the I/O device 20. This completes one cycle of bus operation in the DMA mode.

Upon completion of the cycle of the bus operation in the DMA mode, the bus sequence controller 14 supplies a BFRAME signal to the bus request controller 13. In response to the BFRAME signal the bus request controller 13 supplies an acknowledge signal ACK to both the CPU 11 and the DMAC 12. In response to the ACK signal, an address counter (not shown) provided in the DMAC 12 is updated, whereby the next address data is delivered from the DMAC 12. In this way, data transfer is achieved between the main memory 19 and the I/O device 20 under control of the DMAC 12. Upon completion of the data transmission cycle, the DMAC 12 supplies the DMA end flag signal to the bus request controller 13, whereby the operation in the DMA mode is completed.

When the CPU 11 and the DMAC 12 again supply $BRQ_C$ and $BRQ_D$ signals to the bus request controller 13, the bus request controller 13 detects the priorities of $BRQ_C$ and $BRQ_D$ according to the predetermined bit position X. If the predetermined bit position X has a binary value "0" (unlike in the above-mentioned case) the bus request controller 13 accepts $BRQ_C$, which is transferred to the bus sequence controller 14. In response to the value of the predetermined bit position X and the timing signal DRDY from the bus request controller 13, the bus switch controller 17 supplies a control signal to the second input terminal of the AND gate 21 of the bus switch 18. At the same time, the bus sequence controller 14 supplies the common bus with an address latch enable signal ALE and, for example, a read data signal RD. As a result, the main memory 19 and the I/O device 20 are put under the control of the CPU 11. That is, the program mode is entered.

During operation in the program mode, the DMAC 12 carries out access control when a bus request is no longer supplied. When the CPU 11 again effects a bus request, the access control by the CPU 11 is resumed. In this manner, the CPU 11 and the DMAC 12 alternately carry out access control. That is, a so-called "cycle steal" memory access is achieved.

The "cycle steal" memory accessing technique is a well-known technique in the computer field. In a cycle steal mode, the DMAC effects a data transfer between the main memory 16 and the I/O device 17 independently of CPU control by utilizing the idle portion of an operation cycle of the program mode. The "User Manual For The COSMAC Microprocessor" by RCA Corporation (May 1975) references the well-known cycle steal technique at pages 39 to 43.

Figure 3A:
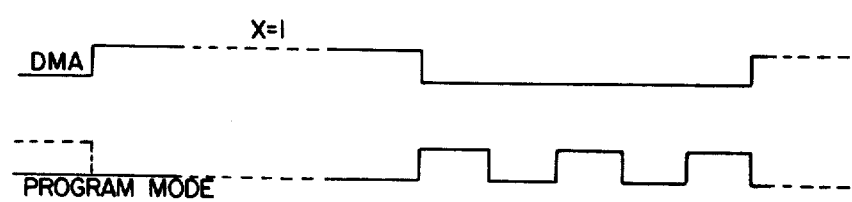
FIG. 3A is a timing diagram for control of a memory access where the significant bit has a logic status of "1"
Figure 3B:
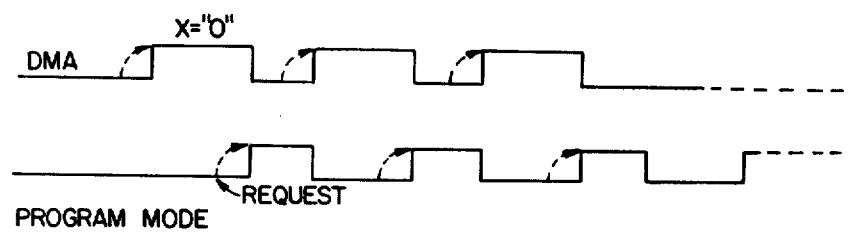
FIG. 3B is a time chart for control of a memory access where the significant bit has a logic status of "0".

FIGS. 3A and 3B indicate, by means of a time chart, the manner in which the DMA mode or program mode is preferentially adopted and executed in response to the logic status, i.e., the value, of the predetermind bit position X. Where the predetermined bit position X has a logic status of "1" as shown in FIG. 3A, the DMA mode is selected and the program mode is prevented from being applied. Upon completion of the DMA mode, a memory access through the CPU is possible to permit execution of the program mode. Where the predetermined bit position X has a logic status of "0" as shown in FIG. 3B, then a memory access through the CPU and the DMA is effected alternately, that is, the cycle steal takes place. At this time, a memory request including a request to use the memory bus is quickly treated in the one-chip processor without causing either the DMA system or CPU to wait for completion of a memory access by means of the other element, as shown in broken lines in FIG. 3B. This significantly decreases any inefficient use of processing time caused by a memory request.

With the above-mentioned embodiment, the hardware has been described to have such an arrangement that when the predetermined bit position X has a logic status of "1", the DMA mode is selected and executed, and where the predetermined bit position X has a logic status of "0", the program mode is preferentially adopted and executed. However, the hardware may obviously have a reverse arrangement. Further, the position of the predetermined bit position X in the format of the command need not be limited as indicated in FIG. 1 but may be arranged as desired.

In the above-mentioned memory access control the bus controller 15 of the CPU-DMAC device 10 controls the bus switching operation of the bus switch 18 in such a manner that a memory access is performed according to the binary information of the predetermined bit position X. Alternatively, the predetermined bit position information may be associated with a program status word (PSW), and a cycle steal access may be selected when the predetermined bit position information and the PSW associated therewith have a predetermined relationship. In this case, the predetermined bit position X is used as a constituent bit of the address section R or command code section I. Thus, the number of necessary bits to constitute the address and command code sections can be reduced by one.

As mentioned above, this invention causes the program mode or DMA mode to be selected in response to the logic status of a predetermined bit position included in a command in a one-chip processor formed of integrally assembled CPU and DMAC elements thereby enabling memory accesses to be carried out efficiently.

It will be apparent to those skilled in the art that various modifications and variations could be made of the invention without departing from the scope or spirit of the invention as recited in the appended claims.

What is claimed is:

1. A memory access control system including an integral assembly of a central processing unit and a direct memory access controller, said integral assembly generating commands and request signals, said system comprising:

a main memory;

an I/O device;

bus means interconnecting said memory and said I/O device to each other, to said central processing unit, and to said direct memory access controller;

means for generating a logic signal representing the logic status of a predetermined bit position in a said generated command;

a bus controller for generating a control signal in response to said logic signal and to a request signal from said integral assembly a bus switch connected to said bus means and responsive to said control signal, said bus switch controlling said bus means to place said memory and said I/O device under the control of said integral assembly when said bus controller receives a logic signal representative of one logic status of said predetermined bit position and to perform a cycle steal memory access between said memory and said I/O device when said bus controller receives a logic signal representative of another logic status of said predetermined bit position.

2. A memory access control system comprising:

an integral assembly of a central processing unit and a direct memory access controller, said integral assembly generating commands and requests;

a main memory;

an I/O device;

bus means interconnecting said memory and said I/O device to each other, to said central processing unit, and to said direct memory access controller;

means for generating a first logic signal representing the logic status of a predetermined bit position in a said generated command;
means for generating program status words;
means for generating a second logic signal in response to the contents of a said program status word;
logic gate circuit means for generating specific signals in response to said first and second logic signals;
a bus controller for generating a bus switch control signal in response to both said specific signal and a request signal from said integral assembly; and
a bus switch responsive to said control signal, said bus switch controlling said bus to place said memory and said I/O device under the control of said integral assembly when said bus controller receives a particular one of said special signals from said logic gate circuit in response to a predetermined relationship between the contents of said program status word and one logic status of said predetermined bit position and to perform a cycle steal memory access between said memory and said I/O device when said bus controller receives a second particular one of sid special signals from said logic gate circuit in response to a predetermined relationship between the contents of said program status word and another logic status of said predetermined bit position.

* * * * *